Figure 1:
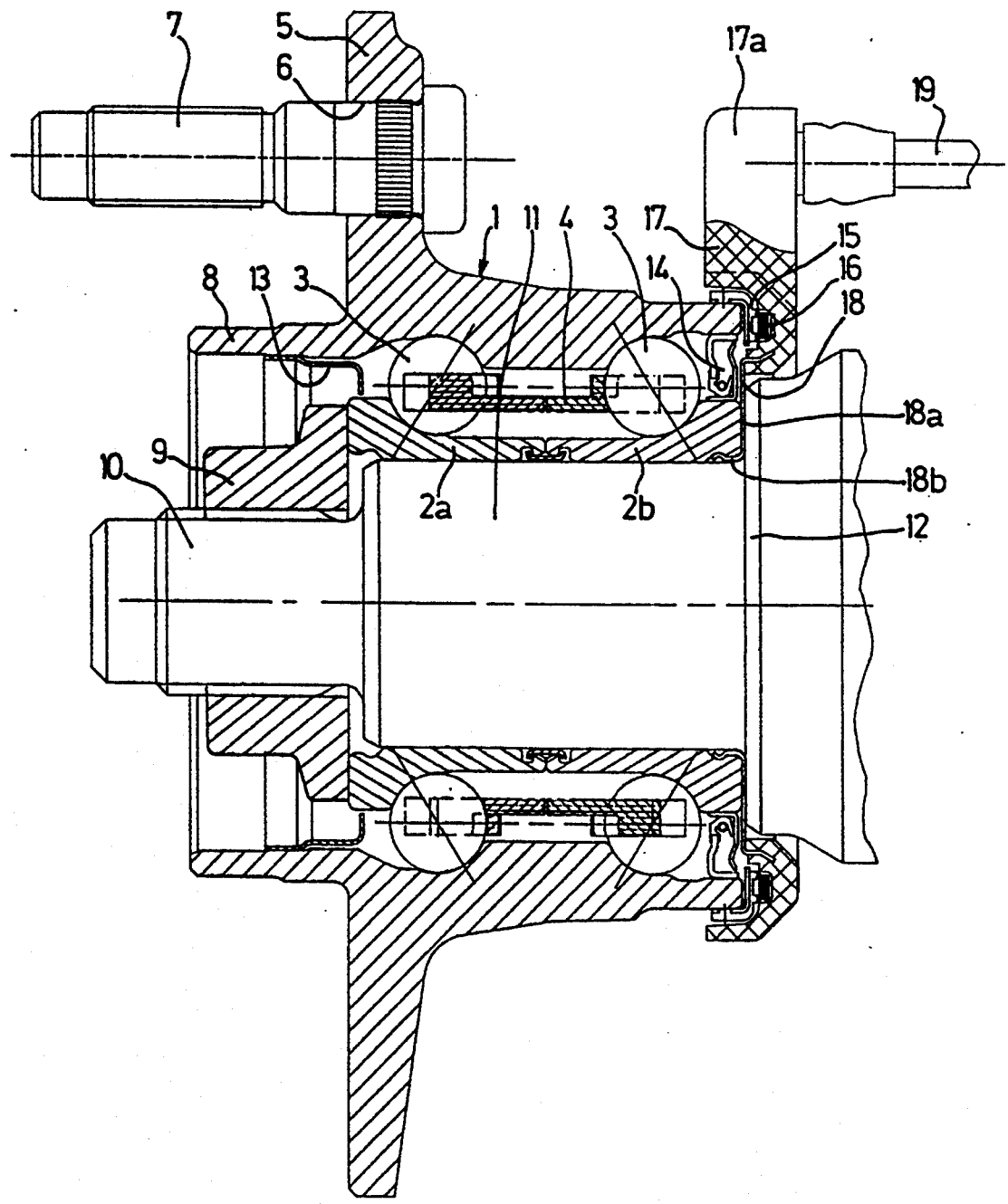

United States Patent [19]

Rigaux et al.

[11] Patent Number: 5,421,654
[45] Date of Patent: Jun. 6, 1995

[54] COMPOSITE ANNULAR ENCODER FOR A BEARING, AND BEARING WITH INFORMATION SENSOR AND POSSESSING SUCH AN ENCODER

[75] Inventors: Christian Rigaux, Artannes sur Indre; Christophe Houdayer, Tours; Claude Caillault, Saint Roch, all of France

[73] Assignee: SKF France, Clamart Cedex, France

[21] Appl. No.: 84,074

[22] Filed: Jun. 30, 1993

[30] Foreign Application Priority Data

Jul. 24, 1992 [FR] France ................................. 92 09111

[51] Int. Cl.⁶ .............................................. F16C 19/08
[52] U.S. Cl. ...................................................... 384/448
[58] Field of Search ................ 384/448; 310/155, 168; 324/207.22, 207.25; 340/682

[56] References Cited

U.S. PATENT DOCUMENTS

| | | | |
|---|---|---|---|
| 4,850,722 | 7/1989 | Bayer | 384/448 |
| 4,946,296 | 8/1990 | Olschewski et al. | 340/682 X |
| 4,948,277 | 8/1990 | Alff | 384/448 |
| 4,988,220 | 1/1991 | Christiansen et al. | 384/448 |
| 5,004,358 | 4/1991 | Varvello et al. | 384/448 X |
| 5,046,867 | 9/1991 | Hilby et al. | 384/448 |
| 5,080,500 | 1/1992 | Hilby et al. | 384/448 |
| 5,131,763 | 7/1992 | Caron | 384/448 |
| 5,195,830 | 3/1993 | Caillault et al. | 384/448 |
| 5,261,752 | 11/1993 | Ouchi | 384/448 |
| 5,287,738 | 2/1994 | Polinsky et al. | 384/448 X |

FOREIGN PATENT DOCUMENTS 2639689 1/1991 France .
2658908 8/1991 France .

Primary Examiner—Daniel P. Stodola
Assistant Examiner—John P. Darling
Attorney, Agent, or Firm—Beveridge, DeGrandi, Weilacher & Young

[57] ABSTRACT

A composite annular encoder (15) for a bearing with information sensor (16), comprises an annular metal support (21) of L-shaped cross section with a plane radial part (21a) and an axial part (21b), and a annular element (22) produced as a single piece made from thermoplastic material, which annular element is constituted by a radial part (22a) which includes the multipole ring (22b) and is overmolded onto the plane radial part (21a) of the metal support, and by an axial retaining part (22c) overmolded onto the outer surface of the axial part (21b) of the metal support. The metal support has, on its axial part, anchoring points (21c, 21d) for the overmolding of the axial retaining part (22c) of the annular element made from thermoplastic material, enabling the thermoplastic annular element and the metal support to be rendered axially and circumferentially integral.

11 Claims, 4 Drawing Sheets

COMPOSITE ANNULAR ENCODER FOR A BEARING, AND BEARING WITH INFORMATION SENSOR AND POSSESSING SUCH AN ENCODER

The present invention relates to a composite annular encoder possessing a multipole ring rigidly attached to a metal support and intended to equip bearings provided with an information-sensor system for detecting the rotation speed, for example. The invention also relates to a bearing with information sensor and provided with such a composite annular encoder.

The invention is particularly beneficial for producing encoders intended to be mounted on the rotating outer race of an integrated wheel bearing for a vehicle fitted with a wheel-antilock brake system.

The composite encoder has an annular active part produced from ferrite-loaded thermoplastic material (plasto-ferrite), magnetized so as to obtain magnetic segments of circumferentially alternating polarity. The encoder interacts with a sensor arranged in a sensor unit facing the active part, also called multipole ring, of the encoder, for detecting the rotation of a rotating member to which the encoder is rigidly attached, the sensor being stationary. It is thus possible to determine the rotation speed of the multipole ring by detecting the variations in magnetic field which are created by the ring rotating in front of the sensor.

The encoder also possesses a metal support intended to support the multipole ring and to attach the encoder rigidly to the rotating member whose rotation speed it is desired to measure. In a general manner, the multipole ring is overmolded directly onto the metal support, the overmolding being performed by injection of a thermoplastic material into a mold in which the metal support is arranged.

The metal support can have an annular general shape of L-shaped cross section with an axial part serving to fix the composite encoder to the rotating outer race of the bearing and a substantially plane radial part supporting the multipole ring of the encoder.

The particular arrangement of the composite encoder of L-shaped cross section mounted on the rotating outer race of a bearing poses two major technical problems: the rigid attachment of the multipole ring to the radial part of the metal support while taking into account the effect of differential thermal expansions between the thermoplastic material of the multipole ring and the metal support; the sealing between the sensor-carrying stationary part and the composite encoder.

Indeed, in the event of temperature variation, the dimensional variations in the multipole ring made from thermoplastic material and in the metal support are different. When the rigid attachment between the multipole ring and the metal support is constituted by plastic/metal anchoring points on the radial part of the metal support, the differential thermal expansions between the two materials have the effect of introducing and concentrating shear stresses in a radial plane in the region of said anchoring points. At the same time, it is also necessary to take into account the radial and axial overall size of the encoder when the bearing with sensor has a restricted space for mounting the encoder.

Moreover, it is important that impurities coming from the outside environment do not manage to penetrate right into the space between the multipole ring of the encoder and the active part of the sensor, which would be liable to compromise the correct operation of the sensor.

In one application of the integrated wheel bearing, it is particularly important that ferromagnetic metal particles coming especially from the wheel brake system cannot penetrate into the space between the multipole ring and the sensor, since said ferromagnetic particles would end up being attached to the multipole ring and disrupting the operation of the sensor.

The object of the present invention is to solve the abovementioned problems by providing a composite encoder which has a small overall size and can be produced economically by using conventional manufacturing means by virtue of a simple design.

The composite annular encoder for a bearing with information sensor according to the invention, comprises an annular metal support of L-shaped cross section with a plane radial part and an axial part, and a multipole ring made from thermoplastic material mounted on the metal support. According to the invention, the encoder possesses an annular element produced as a single piece made from ferrite-loaded thermoplastic material, which annular element is constituted by a radial part which includes the multipole ring and is overmolded onto the plane radial part of the metal support, and by an axial retaining part overmolded onto the outer surface of the axial part of the metal support. The metal support has, on its axial part, anchoring points for the overmolding of the axial retaining part of the annular element made from thermoplastic material, enabling the annular element and the metal support to be rendered axially and circumferentially integral.

The anchoring points are preferably uniformly distributed circumferentially over the axial part of the metal support. They can be constituted by simple holes or notches through which the thermoplastic material penetrates right to the internal surface of the axial part of the metal support during the overmolding operation. It is also possible to produce the anchoring points in the form of bosses projecting from the outer surface of the axial part of the metal support, in which case the thermoplastic material will end up coating the bosses during the overmolding operation.

Such a composite annular encoder is particularly simple to produce by conventional techniques of overmolding onto a metal insert by means of an injection press with axial closure of the mold.

According to the invention, the radial part of the thermoplastic annular element of the encoder is overmolded onto the plane radial part of the metal support without any anchoring point. Differential thermal expansions do not generate shear stresses between the radial part of the thermoplastic and the metal radial part of the encoder, given that these two parts can slide slightly and freely with respect to each other in the radial direction without deleterious consequence on the operation of the encoder.

Likewise, the thermoplastic axial retaining part and the metal axial part of the encoder can undergo differential thermal expansions in the radial direction without introducing shear stresses into the connection zones located at the anchoring points which would be liable to cause the overmolded material to rupture, with the consequences that stem therefrom.

The bearing with information sensor, according to the invention, comprises a rotating race, a non-rotating race, rolling elements arranged between the rotating and non-rotating races, a sensor supported by a sensor carrier rigidly attached to the non-rotating race, and a composite annular encoder with the structure which has just been described. The composite annular encoder can be mounted on the rotating race of the bearing by any suitable means, such as fitting one reasonably tightly into the other, adhesive bonding, etc. In a simple and advantageous manner, the sealing between the stationary sensor carrier and the rotating composite encoder is produced by a single narrow passage extending axially between the outer surface of the axial part of the encoder and the inner surface of an axial depression of the sensor carrier.

Sealing against impurities coming from the outside environment can be further improved by producing a baffle formed between an outer radial extension of the thermoplastic axial part of the encoder and a complementary part of the sensor carrier. Here too, the production of the radial extension of the encoder and of the complementary part of the sensor carrier by conventional means poses no technical difficulty.

According to the invention, the axial retaining part of the encoder or its radial extension in the embodiment with baffle can be magnetized so as to retain the ferromagnetic particles which may form part of the surrounding impurities, as soon as they arrive in the narrow passage between the sensor carrier and the composite encoder. Such a solution considerably enhances the effectiveness of the sealing system for a negligible cost, since the magnetization of the axial retaining part of its radial extension can be carried out simultaneously with the magnetization of the active part of the multipole ring. Thus, by a single overmolding operation and a single magnetization operation, an encoder is thus produced very economically, fulfilling several functions in cooperation with the sensor: the magnetic encoding of the rotation speed of the encoder with respect to the sensor, the sealing of the assembly formed by the encoder and the sensor, and the ferromagnetic-particle trap.

Figure 2:
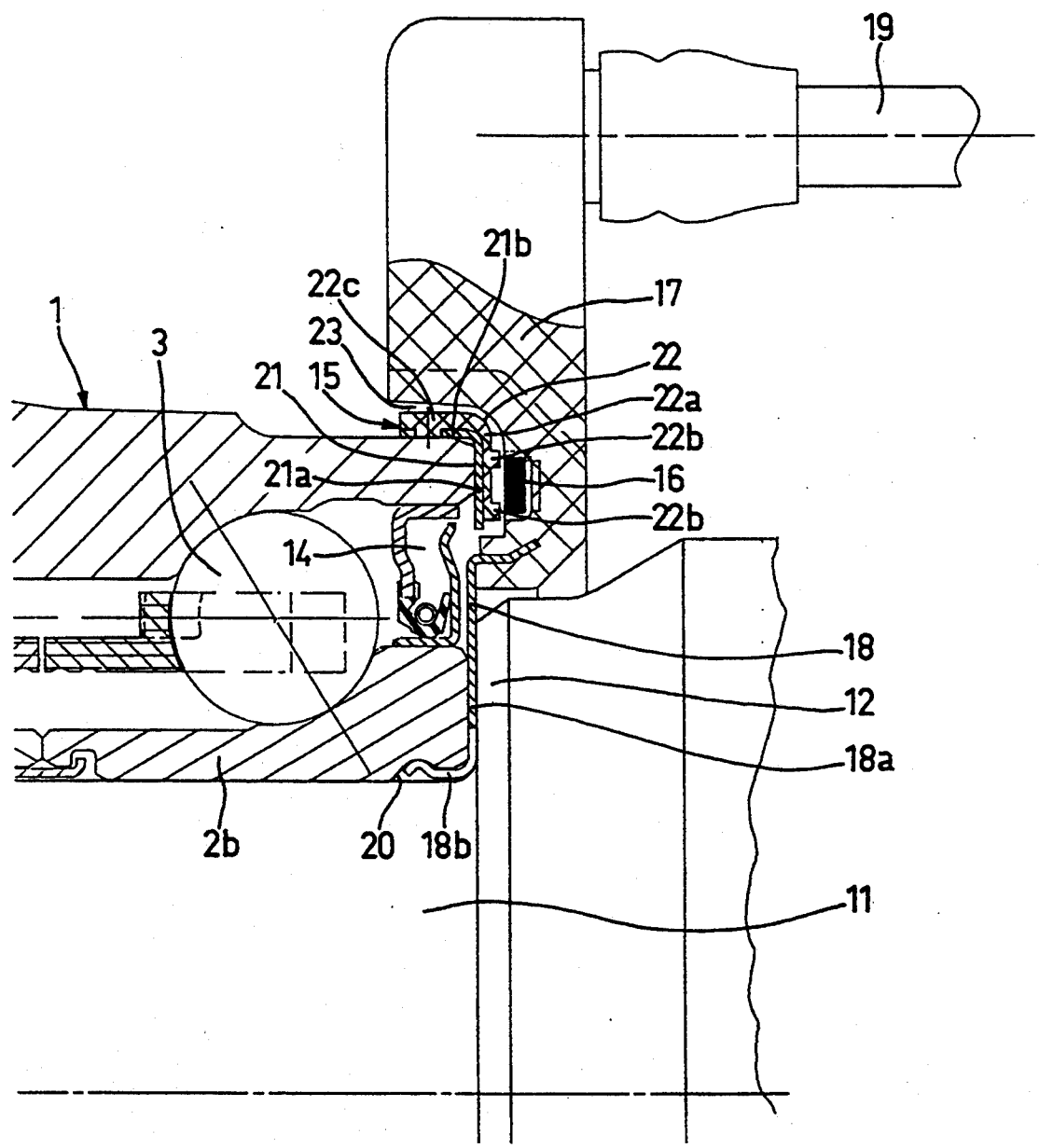
Figure 3:
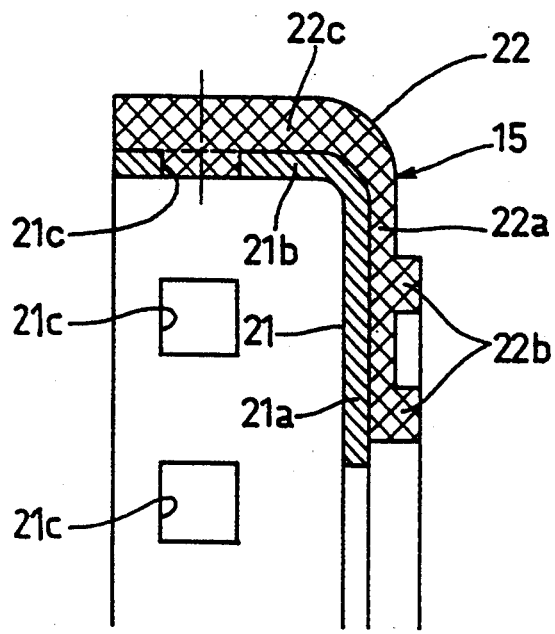
Figure 4:
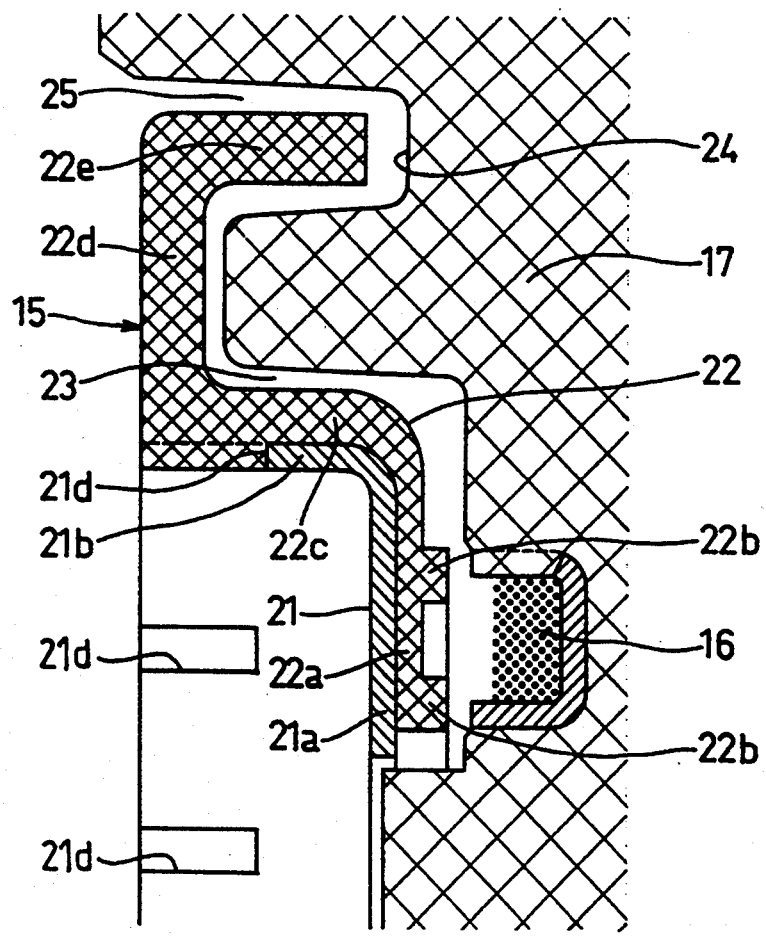
Figure 5:
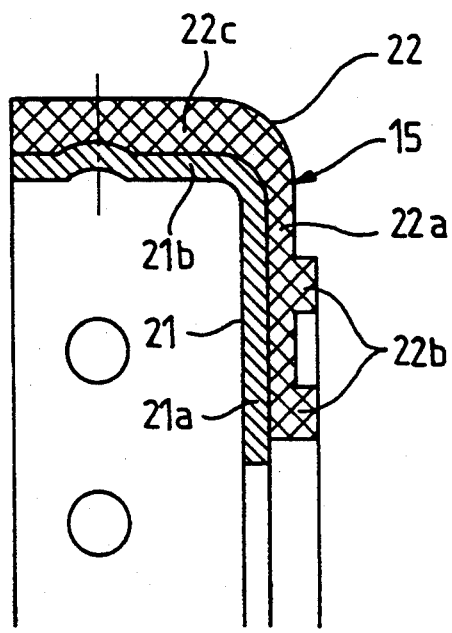

The invention will be better understood on studying the detailed description of a few embodiments which are in no way limiting and are illustrated by the attached drawings, in which:

FIG. 1 is a view in axial cross section of an integrated wheel bearing according to the invention, FIG. 2 is a detailed view of the bearing of FIG. 1, FIG. 3 is a detailed view of the composite annular encoder of the invention according to FIG. 3, FIG. 4 is a detailed view of the composite annular encoder of the invention, according to a second embodiment of the invention, which interacts with the sensor carrier, forming a sealing baffle, and FIG. 5 is a detailed view of a third embodiment of the invention.

As illustrated in FIG. 1, the integrated wheel bearing is of the information-sensor type. The bearing comprises a rotating outer race 1, two non-rotating inner races 2a 2b arranged axially side by side, and two rows of rolling elements 3 held in an annular cage 4 arranged between the rotating outer and non-rotating inner races of the bearing.

The rotating outer race 1 has an annular mounting collar 5 provided with several circumferentially-distributed axial perforations 6 for receiving mounting dogs 7 for a vehicle wheel (not shown). The outer axial end of the rotating outer race 1 has a tubular bearing-surface 8 serving to center both the brake disk (not shown) and the wheel of the vehicle and housing internally a lock nut 9 screwed onto the free end 10 of a journal 11 on which the inner races 2a 2b of the bearing are mounted. The journal 11 has a radial shoulder 12 which delimits, with the lock nut 9, an axial space for immobilizing the inner races 2a 2b of the bearing. The bearing is sealed by conventional sealing systems 13, 14.

A composite annular encoder 15 is rigidly attached to an end part of the rotating outer race 1 of the bearing 1, opposite the tubular centering bearing-surface 8, and rotates with the outer race 1 in order to generate a variation in magnetic field in a sensor 16 arranged facing the encoder 15 with a small air gap. The operation of the encoder and of the sensor is known per se and will not be described in detail hereinbelow.

The sensor 16 is embedded in an annular sensor carrier 17 made from plastic material which is overmolded onto the outer peripheral part of an annular metal support 18 mounted on the non-rotating race 2b. The sensor unit constituted by the sensor 16, the sensor carrier 17 and the metal support 18 is stationary, the composite encoder 15 being driven in rotation by the rotating outer race 1 of the bearing. The sensor carrier 17 has a connection outlet 17a connected to a connection cable 19 which establishes the communication between the sensor 16 and a unit, not shown, for processing the signal.

As may be seen in more detail in FIG. 2, the metal support 18 of the sensor unit has a plane radial portion 18a in the form of a washer placed axially between an end face of the inner race 2b of the bearing and the radial shoulder 12 of the journal 11. The gripping of the radial portion 18a of the metal support 18 enables, on the one hand, a sensor unit to be angularly positioned, and on the other hand, enables it to be immobilized.

For radially centering the sensor unit, the metal support 18 has a centering portion 18b in the form of axial tongues forming hooks which end up interacting with an annular groove 20 provided on the non-rotating annular race 2b of the bearing. The mounting of the centering portion 18b on the non-rotating race 2b is effected by axial clipping-in of the tongues into the groove 20.

The composite annular encoder 15 includes an annular metal support 21 of L-shaped cross section with a plane radial part 21a and an axial part 21b which is fitted axially onto the outer surface of the end part of the rotating outer race 1 of the bearing. Onto the metal support 21 is overmolded an annular element 22, made as a single piece made from thermoplastic material, comprising a radial part 22a including the multipole ring 22b of the encoder, and an axial retaining part 22c on the outer surface of the axial part 21b of the metal support 21 of the encoder (FIG. 3). The axial part 21b of the metal support 21 is provided with circumferentially distributed holes 21c which are filled by the thermoplastic material for overmolding the axial retaining part 22c of the annular element 22 of the encoder 15. In this manner, the two constituent parts of the encoder 15, namely the metal support 21 and the thermoplastic annular element 22 are rendered axially and circumferentially integral with each other.

The radial part 21a of the metal support 21 offers a plane surface onto which the radial part 22a of the thermoplastic element 22 is overmolded. This configuration allows for a slight radial sliding between said radial parts 21a and 22 upon differential thermal expansions due to the choice of the materials (steel for the metal support 21 and plastic for the element 22).

The sensor carrier 17 has an axial depression enabling the end of the rotating outer race 1 of the bearing, provided with the composite sensor 15, to be received axially. The inner surface of the axial depression of the sensor carrier 17 forms, with the outer surface of the axial retaining part 22c of the encoder 15, a narrow passage 23 extending axially which acts as sealing, protecting the sensor 16 and the multipole ring 22b from impurities coming from the outside environment.

If there is a risk of the outside environment producing ferromagnetic particles, the axial retaining part 22c of the encoder 15 is preferably magnetized. In this manner, the ferromagnetic particles cannot get through the narrow passage 23 and so reach the space between the multipole ring 22b, which is produced in the form of a concentric double ring, and the sensor 16, since said ferromagnetic particles are collected on the magnetized axial retaining part 22c of the encoder 15.

FIG. 4 shows a variant of the encoder 15, which has a radial extension 22d at the end of the thermoplastic axial retaining part 22c of the encoder 15. The radial extension 22d has an axial return 22e which is housed in an annular axial notch 24 of the sensor carrier 17. The annular notch 24 is coaxial with the annular depression of the sensor carrier 17 receiving the encoder 15. The radial extension 22d, with its axial elbowed end 22e, is produced as one piece with the thermoplastic axial retaining part 22c of the encoder 15, and forms, with the sensor carrier 17, a baffle 25 which improves the sealing of the narrow passage 23 between the outer surface of the thermoplastic axial retaining part 22c of the sensor 15 and the inner surface of the axial depression of the sensor carrier 17.

It is possible to make the radial extension 22d magnetic in order to constitute a ferromagnetic-particle trap for preventing these particles from reaching the multipole ring 22b of the encoder 15.

In order to render the metal support 21 and the thermoplastic annular element 22 axially and circumferentially integral, the axial part 21b of the metal support 21 is provided with circumferential notches 21d (FIG. 4) which are filled by the thermoplastic material during the overmolding of the annular element.

We claim:

1. A composite annular encoder for a bearing with information sensor, comprising:
   an annular metal support of L-shaped cross section with a plane radial part and an axial part which has an outer surface;
   an annular element mounted on the metal support and produced as a single piece made from ferrite-loaded thermoplastic material;
   said annular element including a radial part and an axial retaining part, said radial part including a multipole ring and being overmolded onto the plane radial part of the metal support, said axial retaining part being overmolded onto the outer surface of the axial part of the metal support;
   said metal support having anchoring points on its axial part for the overmolding of the axial retaining part of the ferrite-loaded thermoplastic annular element, enabling the ferrite-loaded thermoplastic annular element and the metal support to be rendered axially and circumferentially integral.

2. A composite annular encoder according to claim 1 wherein one end of the axial retaining part has a radial extension, the outer end of which is elbowed to create a baffle for sealing from the outside environment.

3. A composite annular encoder according to claim 2 wherein the axial retaining part of the annular element is magnetized.

4. A composite annular encoder according to claim 3 wherein the radial extension is magnetized.

5. An encoder according to claim 1, characterized in that the anchoring points (21c, 21d) are uniformly distributed circumferentially over the axial part (21b) of the metal support and are selected from the group consisting of holes, notches and bosses.

6. A bearing with information sensor, comprising a rotating race (1), a non-rotating race (2a, 2b), rolling elements (3) arranged between the rotating and non-rotating races, an information sensor (16) mounted in a sensor carrier (17) which is rigidly attached to the non-rotating race, and a composite annular encoder (15) according to claim 1 mounted on the rotating race, the multipole ring (22b) of the encoder being oriented axially facing the sensor (16) so as to enable the rotation speed of the rotating race to be determined by detecting the variations in magnetic field which are created in the sensor by the rotating multipole ring.

7. A bearing according to claim 6, characterized in that the sensor (16) is embedded in the sensor carrier (17) made from plastic which has an annular axial depression for receiving the encoder (15), the outer surface of the ferrite-loaded thermoplastic axial retaining part (22c) of the encoder delimiting, with the inner surface of the axial depression of the sensor carrier, a narrow annular passage (23) extending axially and sealing the multipole ring and sensor (16) assembly from the outside environment.

8. A bearing according to claim 7, characterized in that the ferrite-loaded axial retaining part (22c) of the thermoplastic element (22) is magnetized.

9. A bearing according to claim 7, characterized in that one end of the ferrite-loaded thermoplastic axial retaining part (22c) of the encoder (15) is extended by a radial extension (22d), the outer end (22e) of which is elbowed in order to be received in an annular axial notch (24) of the sensor carrier (17) so as to create a baffle (25) for sealing from the outside environment.

10. A bearing according to claim 9, characterized in that the radial extension (22d) of the ferrite-loaded thermoplastic element (22) of the encoder is magnetized.

11. A bearing according to claim 6, characterized in that the anchoring points are uniformly distributed circumferentially over the axial part of the metal support and are selected from the group consisting of holes, notches and bosses.

* * * * *